(12) United States Patent
Ellis et al.

(10) Patent No.: US 11,449,722 B2
(45) Date of Patent: Sep. 20, 2022

(54) PRINTING DEVICE TO SKEW MEDIA

(71) Applicant: Hewlett-Packard Development Company, L.P., Spring, TX (US)

(72) Inventors: Daniel Scott Ellis, Boise, ID (US); Darryl L. Beemer, Boise, ID (US); Gary L. Godderidge, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,874

(22) PCT Filed: Dec. 20, 2018

(86) PCT No.: PCT/US2018/066965
§ 371 (c)(1),
(2) Date: Jan. 5, 2021

(87) PCT Pub. No.: WO2020/131089
PCT Pub. Date: Jun. 25, 2020

(65) Prior Publication Data
US 2021/0303943 A1     Sep. 30, 2021

(51) Int. Cl.
*G06K 15/02*     (2006.01)
*G06K 15/16*     (2006.01)

(52) U.S. Cl.
CPC ......... *G06K 15/16* (2013.01); *G06K 15/1809* (2013.01)

(58) Field of Classification Search
CPC ..... G06K 15/16; G06K 15/1809; B41J 13/03; B65H 29/60
See application file for complete search history.

(56) References Cited

U.S. PATENT DOCUMENTS

| | | | |
|---|---|---|---|
| 4,162,786 A | 7/1979 | Bullock | |
| 5,424,821 A | 6/1995 | Sampath | |
| 5,709,374 A | 1/1998 | Taylor et al. | |
| 6,053,494 A | 4/2000 | Baskette et al. | |
| 6,227,531 B1 | 5/2001 | Guerrero et al. | |
| 6,834,853 B2 | 12/2004 | Trovinger et al. | |
| 8,144,342 B2 | 3/2012 | Munoz-Bustamante | |
| 9,254,693 B2 | 2/2016 | Maeda | |
| 2005/0012263 A1 | 1/2005 | Koyanagi et al. | |
| 2006/0163801 A1 | 7/2006 | deJong et al. | |
| 2006/0197038 A1* | 9/2006 | Park | G01N 21/86 250/559.37 |
| 2008/0193180 A1* | 8/2008 | Shim | B41J 11/003 399/395 |
| 2009/0091075 A1* | 4/2009 | Yasumoto | B65H 9/16 271/250 |
| 2012/0181743 A1* | 7/2012 | Akimoto | B65H 7/08 271/228 |
| 2012/0219343 A1 | 8/2012 | Ferrara et al. | |
| 2013/0063774 A1* | 3/2013 | Nuggehalli | G06F 3/1268 358/1.15 |
| 2013/0113158 A1* | 5/2013 | Miyazawa | B65H 5/36 271/227 |
| 2015/0175378 A1 | 6/2015 | Watanabe | |
| 2018/0050881 A1* | 2/2018 | Tanigami | B65H 23/038 |
| 2018/0273325 A1* | 9/2018 | Bhide | B65H 9/002 |
| 2019/0315586 A1* | 10/2019 | Yamane | B65H 9/20 |

* cited by examiner

*Primary Examiner* — Huo Long Chen
(74) *Attorney, Agent, or Firm* — Brooks Cameron & Huebsch PLLC

(57) ABSTRACT

A printing device to skew print media in accordance with pre-determined offsets, in order to assist a user to delineate the print media of successive print jobs.

13 Claims, 5 Drawing Sheets

Detecting, Using A Sensor, An Alignment Of A Media That Is Received And Driven Along A Media Path, The Media Path Extending From A Media Source To An Output Region 510

Causing A Drive System To Skew The Media To A Predefined Media Offset Position As The Media Is Driven To An Image Rendering Sub-System 520

Causing The Image Rendering Sub-System To Orient An Output Image That Is Formed On The Media Based On The Predefined Media Offset Position 530

Wherein The Drive System Outputs The Media, With The Output Image, To Have The Predefined Media Offset Position At The Output Region 540

FIG. 5

PRINTING DEVICE TO SKEW MEDIA

BACKGROUND

Printing devices, especially networked or shared printing devices, can process a high volume of different print jobs. Some printing devices provide job offset functionality that allows users to sort and separate the different print jobs for ease of collection. In addition, some printing devices include specialized components to perform after-print tasks, such as stapling, but such features are typically included as added expenses for the user.

BRIEF DESCRIPTION OF THE DRAWINGS

FIG. 5 illustrates an example method for offsetting a print media.

DETAILED DESCRIPTION

Examples pertain to a printing device for offsetting a print media, in accordance with a specification of a print job. An example printing device can include a sensor, a drive system, an image rendering sub-system and a controller. The controller can detect, using the sensor, an alignment of a media that is received and driven along a media path by the drive system, where the media path extends from a media source to an output region. The controller can cause the drive system to skew the media to a predefined media offset position as the media is driven to the image rendering sub-system. Further, the controller can cause the image rendering sub-system to orient an output image that is formed on the media based on the predefined media offset position. The drive system can then output the media, with the output image, to have the predefined media offset position at the output region.

Some examples described herein can generally require the use of computing devices, including processing and memory resources. For example, one or more examples described herein may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1:
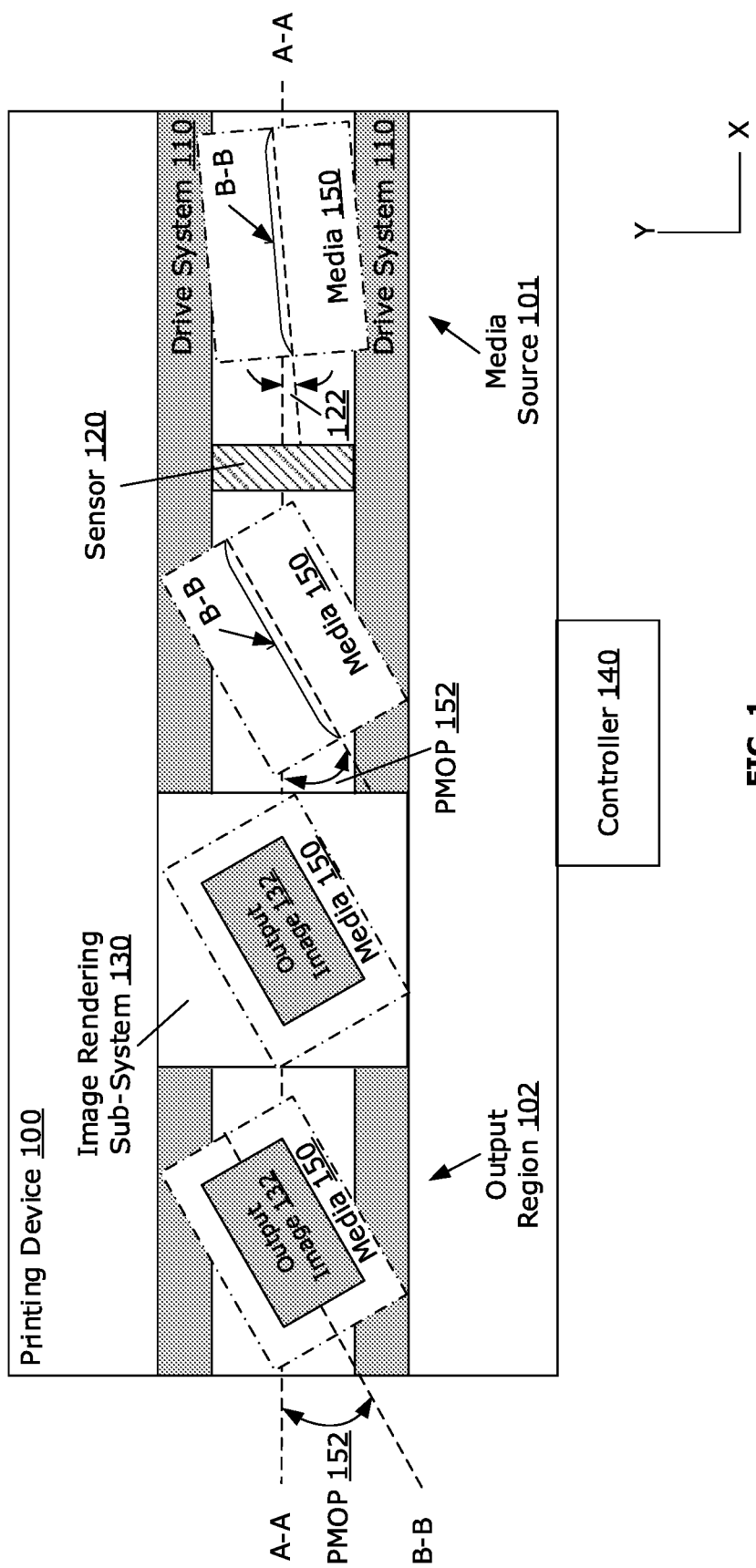
FIG. 1 illustrates an example printing device for offsetting a print media.

FIG. 1 illustrates an example printing device for offsetting print media, in accordance with specifications of corresponding print jobs. In examples, a printing device 100 can include a drive system 110, a sensor 120, an image rendering sub-system 130 and a controller 140. The printing device 100 can include any peripheral device for rendering graphics, text, etc. on media (e.g., laser printers, inkjet printers, etc.). According to examples, the printing device 100 can be operated to skew media (e.g., paper) to an acute angle (e.g., predefined media offset position) relative to a media path of the printing device 100, so that the media is output at the acute angle, and successive media of a given print job can be skewed in the same manner.

In examples, the print media of successive print jobs can be subjected to alternative offsets, with print media of the same print job having the same skew offset, while print media of successive print jobs having alternative skew offsets. By applying alternative predefined media offset positions to consecutive print jobs, the printing device 100 can provide offset functionality to the printing device 100. Among other advantages, a user can readily delineate the print media of successive print jobs based on the skew that is applied to the print media of each print job.

Under conventional approaches, printing devices that provide offset functionality include hardware that adds significant cost and footprint (sometimes even the height) to the printing device. In contrast to such conventional approaches, the printing device 100 can utilize standard hardware that has an alternative use of aligning incoming print media (e.g., to prevent jams from misfed documents). For example, the printing device 100 can use skew rollers, which otherwise have a primary or existing function of orienting incoming print media to prevent misfeeds, to skew media to a desired offset position, before the print media is output. In examples, the skew rollers can skew incoming print media to a desired offset before an image is rendered on the media. Among other benefits, examples provide that the printing device can be modified post-manufacture, through programming (e.g., firmware updates), to enhance the capabilities of the printing device 100 and enable print media to be output with an offset skew, by design, for a given print job.

In FIG. 1, the controller 140 causes the drive system 110 to drive the media 150 along the media path, which can extend from the media source 101 to the output region 102. At the media source 101, a media axis B-B of the media 150 is misaligned with a media path axis A-A of the media path. As the drive system 110 drives the media 150 from the media source 101 to the output region 102, the controller 140 causes the sensor 120 to detect that the media axis B-B axis is not aligned with the media path A-A axis by an initial skew 122 in a leftward direction (or in a counterclockwise direction when viewed along the Z-axis of the page). As the drive system 110 drives the media 150 to the image rendering sub-system 130, the controller 140 causes the drive system 110 to skew the media 150 to a predefined media offset position 152 before an output image (e.g., output image 132) can be rendered on the media 150. In determining the actual degree of skew to impart upon the media 150, the controller 140 analyzes the initial skew 122 and the direction of the initial skew as detected by the sensor 120. At the image rendering sub-system 130, the controller 140 causes an output image 132 to be oriented based on the predefined media offset position 152 and then causes the output image 132 to be formed on the media 150. The controller 140 can then cause the drive system 110 to output the media 150 at the output region 102 with the predefined media offset position 152.

The media 150 can travel along the media path, which extends from the media source 101 to the output region 102. The media can be provided at the media source 101 by receptacles internal to the printing device (e.g., internal paper tray) or by receptacles or feed mechanisms external to the printing device (e.g., bypass tray, manual feed tray, etc.). The output region 102 (e.g., output tray) receives the media and the sorted print jobs after an output image has been rendered on the media. The output region 102 can also receive media without an output image (e.g., blank media with or without skew, colored media with or without skew, etc.) positioned between print jobs to further distinguish between print jobs.

The media path axis (e.g., axis A-A) can extend through a center of the media path and a center of the image rendering subsystem 130. The A-A axis in FIG. 1 can be fixed so as to serve as a reference axis from which misalignments detected by the sensor 120 (e.g., initial skew 122) and from which skews of media prescribed by the predefined media offset positions (e.g., 152) can be measured. A media axis of the media (e.g., media axis B-B of media 150) refers to an axis that can extend through a center of the media, where the media axis can be parallel to a first edge of the media (e.g., long edge) and perpendicular to a second edge of the media (e.g., short edge). In the example of FIG. 1, the media axis B-B and the media path axis A-A are misaligned at the media source 101 by the initial skew 122 in a leftward or counterclockwise direction.

The printing device can include one or more sensors. The one or more sensors can be used to detect any inadvertent initial skewing or any misalignment of the media (e.g., misfed document) that may occur within a permissible range of variation in the operation of the printing device 100 (e.g., operational tolerances) or malfunctions of the printing device 100 (e.g., improper feed from the media source 101, uneven drive from the drive system 110, etc.). In examples, if an initial skew is unaccounted for, the output image formed on the media by the image rendering sub-system 130 may be askew, affecting the quality of the print job. In the example of FIG. 1, the printing device 100 includes a single sensor to detect skew of the media as the drive system 110 drives the media from the media source 101 to the output region 102 (e.g., sensor 120). The sensor 120 detects the initial skew 122 in the leftward or counterclockwise direction between the media axis B-B of the media 150 and the media path axis A-A.

In variations, the printing device 100 can include an additional sensor(s) located between the sensor 120 and the image rendering sub-system 130. The additional sensor(s) can detect an alignment of the media axis (e.g., media axis B-B) relative to the media path axis (e.g., media path axis A-A) after the controller 140 causes the drive system 110 to skew the media 150 to a predefined media offset position (e.g., predefined media offset position 152) but before an output image (e.g., output image 132) can be rendered on the media 150. The controller 140 can compare the actual amount of skew as detected by the additional sensor(s) with the desired amount of skew (e.g., predefined media offset position 152) and then, if the actual and desired skews differ, the controller 140 can then implement instructions to correct for the discrepancy. In this way, the additional sensor(s) can provide a closed-loop system to ensure that the actual amount of skew or rotation imparted upon the media accurately aligns with the predefined media offset positions.

Figure 2A:
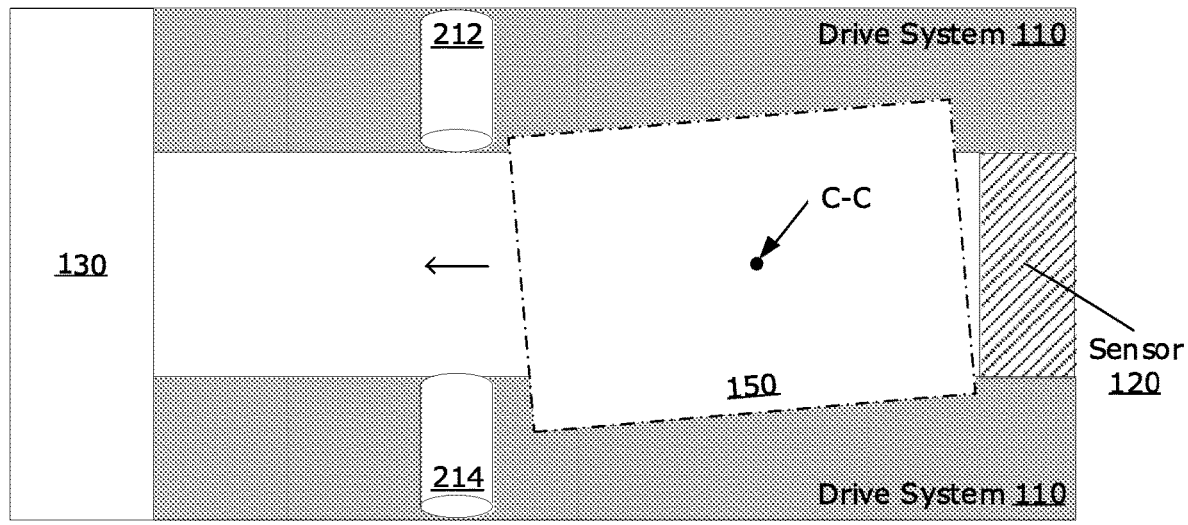
FIG. 2A and FIG. 2B illustrate a closeup view of the drive system for the example printing device of FIG. 1.
Figure 2B:
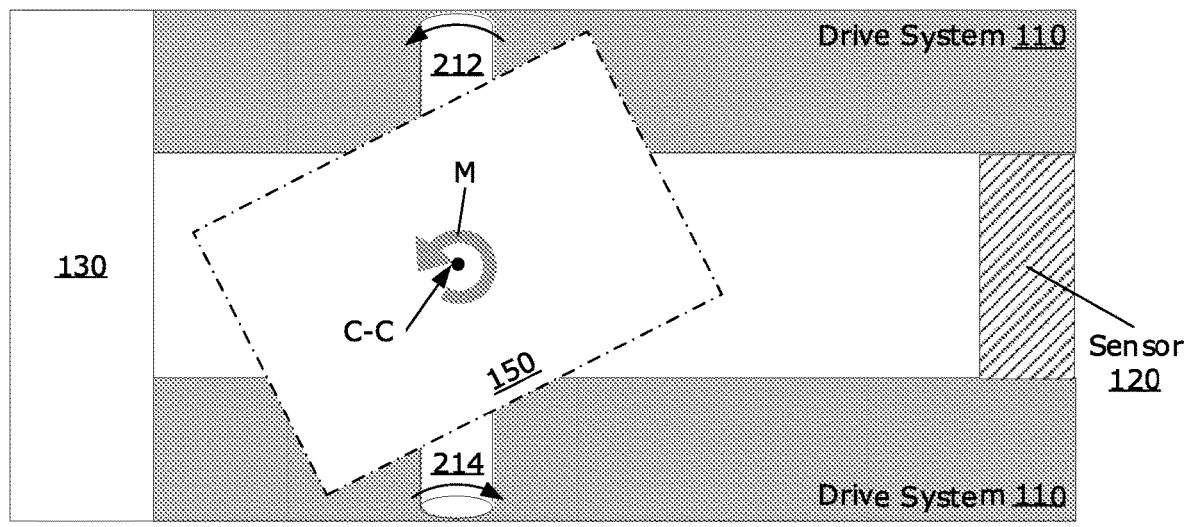

FIG. 2A and FIG. 2B illustrate a closeup view of the drive system for the example printing device of FIG. 1. The drive system 110 can include an operative combination of a motor, belt or other drive assembly component, to cause movement of the print media along a predefined media path. The drive system 110 can advance the media from the media source 101 to the output region 102. In addition, the drive system 110 can include skew rollers to skew media to the predefined media offset positions. For example, in FIG. 2A and FIG. 2B, the drive system 110 can include skew rollers 212, 214 positioned between the sensor 120 and the image rendering sub-system 130.

Typically, mechanisms utilized to provide job offset functionality are located in a region of the printing device after the media has passed through the image rendering sub-system, not before, which can not only add to cost and footprint of the printing device as described above, but can also add to the time to process each print job since each print job must be compiled in a buffer area of the media path prior to shifting the media to the left or right and then ejecting the media into the output area. Examples provided avoid such a slowdown to throughput when providing job offset functionality because the skew rollers that skew or rotate the media can do so while the media is moving through the media path at full speed.

The controller can cause the skew rollers 212, 214 to spin at different directions, speeds, times, etc. (e.g., opposite directions, same direction but different speed, rotating only one skew roller, etc.). FIG. 2A illustrates the media 150 before being intentionally skewed by the rollers 212, 214 of the drive system 110. The media 150 can include a media axis C-C that extends along a Z-axis of the media 150 (e.g., out of the page). FIG. 2B illustrates the media 150 skewed by the rollers 212, 214 of the drive system 110. The drive system 110 can cause a moment M about the media axis C-C of the media 150 by spinning the skew roller 212 in one direction and by spinning the skew roller 214 in another direction.

In variations in which the printing device 100 can include an additional sensor(s) located between the sensor 120 and the image rendering sub-system 130, the skew rollers 212, 214 can be utilized to account for any discrepancy between the actual skew or rotation imparted upon the media as detected by the additional sensor(s) and the desired skew or rotation (e.g., predefined media offset position 152). For example, if the additional sensor(s) detects an over rotation/skew of the media so that the media is rotated or skewed more than the predetermined media offset position, then the controller 140 can cause the skew rollers 212, 214 to operate in a manner to correct the over rotation/skew.

Figure 3:
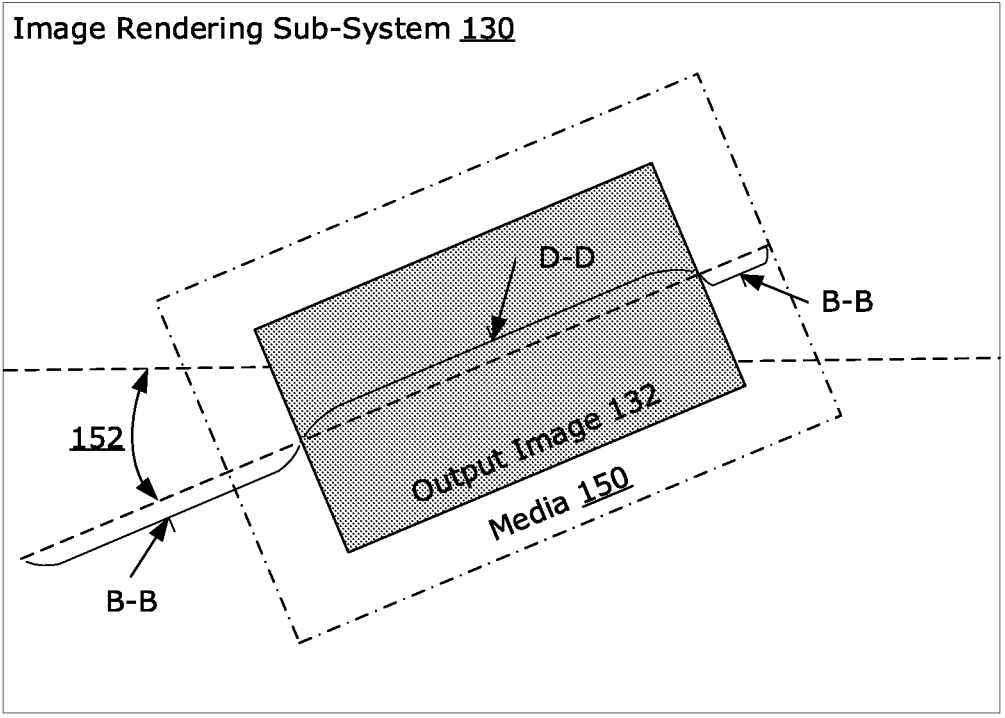
FIG. 3 illustrates a closeup view of the image rendering sub-system for the example printing device of FIG. 1.
Figure 3:
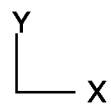

FIG. 3 illustrates a closeup view of the image rendering sub-system 130 for the printing device of FIG. 1. The image rendering sub-system 130 is a region of the printing device where an output image (e.g., text, graphics, etc.) can be formed onto the media. Typically, printing devices fix an alignment of the output image relative to such a region and then correct (e.g., deskew) an alignment of the media to ensure that the output image and the media squarely align when the output image is formed on the media. In examples, the controller 140, having already caused the drive system 110 to align the media 150 to the predefined media offset position 152, can cause the image rendering sub-system 130 to orient the output image 132 so that the output image 132 is formed on the media 150 at the same predefined media offset position (e.g., 152). In an example of FIG. 3, the output image 132 can include an output image axis D-D to be oriented and aligned with the media axis B-B of the media 150. As indicated in FIG. 3, both the output image axis D-D and the media axis B-B are aligned relative to the media path axis A-A to the predefined media offset position 152.

Figure 4:
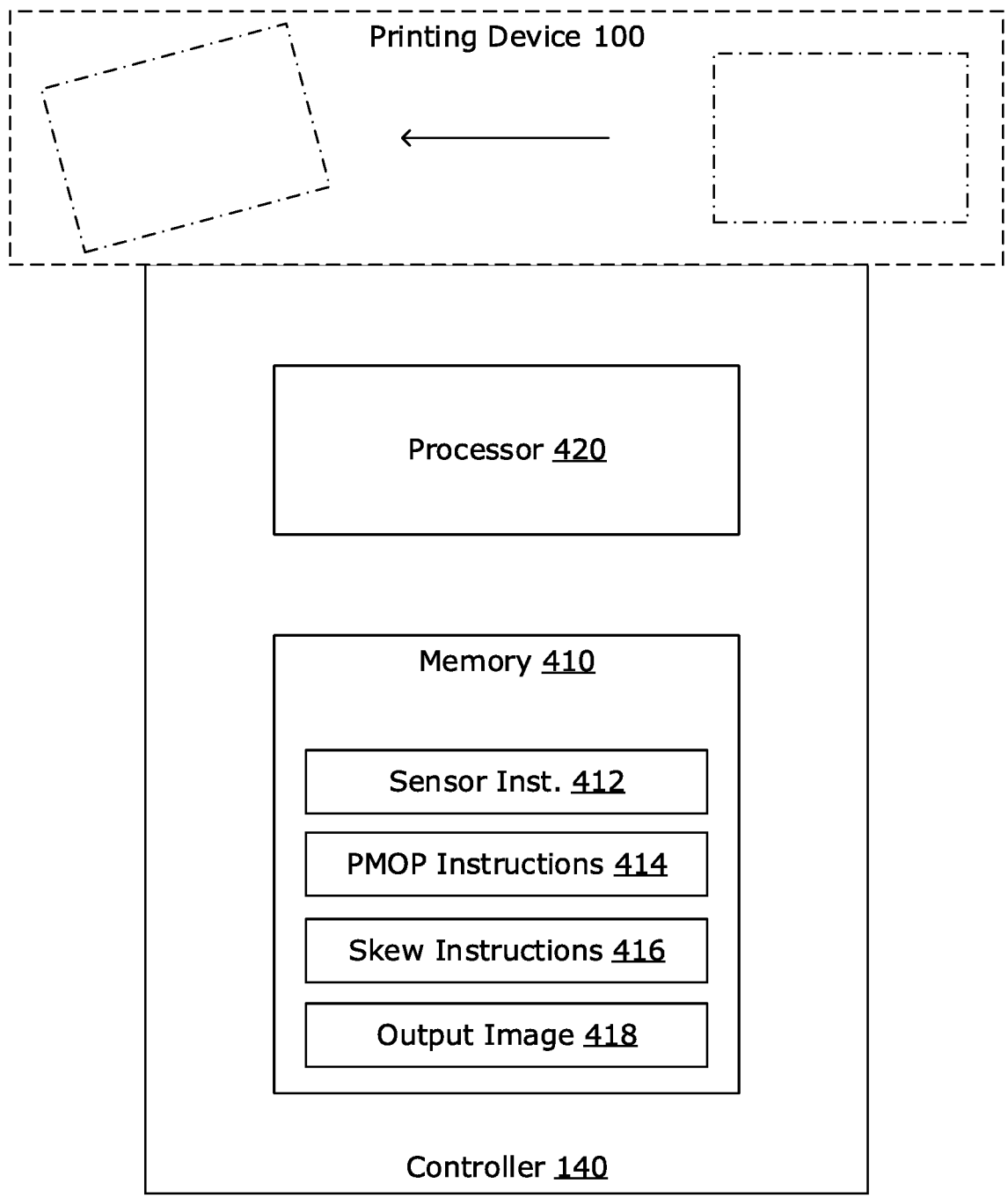
FIG. 4 illustrates an example controller for the example printing device of FIG. 1.

FIG. 4 illustrates an example controller 140. The controller can include a memory 410 to store a set of instructions and a processor 420 to execute the set of instructions. In examples, the memory 410 can include sensor instructions 412 to cause the one or more sensors (e.g., sensor 120) to detect an alignment for each media. The alignment of each media can include a degree and a direction of initial skew. In the example of FIG. 1, the controller 140 can cause the sensor to detect a degree of initial skew 122 between the media axis B-B of the media 150 and the media path axis A-A. In addition, the controller 140 can cause the sensor 120 to detect the direction of the initial skew 122 to be in a leftward direction as the media 150 travels from the media source 101 to the output region 102 (or in a counterclockwise direction when viewed along the Z-axis of the page). As the sensor 120 detects the degree and direction in which each media is aligned as each media approaches the image rendering sub-system 130, the sensor instructions 412 can provide "on the fly" data to be utilized by the controller 140 when determining the actual skew to impart upon the media 150. For example, if the initial skew 122 is equivalent to 1 degree in the leftward or counterclockwise direction and the predetermined media offset position is set to 5 degrees in the leftward or counterclockwise direction, then the actual skew to be imparted upon the media is 4 degrees in the leftward or counterclockwise direction.

In variations in which the printing device 100 can include an additional sensor(s) located between the sensor 120 and the image rendering sub-system 130, the sensor instructions 412 can further cause the additional sensor(s) to detect an alignment of the media axis (e.g., media axis B-B) relative to the media path axis (e.g., media path axis A-A) after the controller 140 has caused the drive system 110 to skew the media 150 to a predefined media offset position (e.g., predefined media offset position 152) but before an output image (e.g., output image 132) can be rendered on the media 150. In this way, the additional sensor(s) can detect an actual skew or rotation imparted upon the media.

The memory 410 can include predefined media offset position instructions 414 to store predefined media offset positions. The instructions 414 can include the maximum offset positions in either direction (e.g., leftward, rightward), which can be defined by a dimension of the image rendering subsystem 130 of the printing device 100. For example, in FIG. 1, the media 150 at the image rendering sub-system 130 is skewed to its maximum predefined media offset position (e.g., 152) since further skewing can cause a portion of the media 150 to abut against or extend beyond a boundary of the image rendering sub-system 130 and thereby impede or restrict the flow of the media 150 through the media pathway (e.g., paper jam, etc.). In addition, the predefined media offset position instructions 414 can include multiple settings for the predefined media offset positions in which consecutive print jobs can have alternative or sufficiently different predefined media offset positions to yield the desired offset effect (e.g., 5 degrees leftward, 0 degrees, 5 degrees rightward, etc.). The settings can include default settings stored in the predefined media offset position instructions 414 or the settings can be inputted by a user of the printing device 100.

The memory 410 can include skew instructions 416 to cause the drive system 110 to skew the media to the predefined media offset positions. The skew instructions 416 can determine the degree of skew to be applied to the media based on the skew detected by the one or more sensors (e.g., sensor 120) and the predefined media offset position related to the print job associated with the media. In some examples, the skew instructions 416 can cause the drive system 110 to skew the media less than the degree provided by its predefined media offset position. In such examples, if the sensor 120 detects an initial skew of 1 degree in the leftward or counterclockwise direction, and the predefined media offset position is set to 5 degrees also in the leftward or counterclockwise direction, then the skew instructions 416 can alter a rotational speed or a direction of rotation of at least one of the skew rollers (e.g., 212, 214) to skew the media 4 degrees in the leftward or clockwise direction.

In other examples, the skew instructions 416 can cause the drive system 110 to skew the media more than the degree provided by its predefined media offset position. In such examples, if the sensor 120 detects an initial skew of 1 degree in the rightward or clockwise direction, and the predefined media offset position is set to 5 degrees in the leftward or counterclockwise direction, then the skew instructions 414 can alter a rotational speed or a direction of rotation of at least one of the skew rollers (e.g., 212, 214) to skew the media 6 degrees in the leftward or counterclockwise direction. In this way, the skew to be imparted upon each media can be precisely determined on the fly to account for any initial skew or misalignments of the media that may inadvertently occur as the media travels from the media source 101 to the image rendering sub-system 130.

In variations in which the printing device 100 can include an additional sensor(s) located between the sensor 120 and the image rendering sub-system 130, the skew instructions 414 can further alter a rotational speed or a direction of rotation of at least one of the skew rollers (e.g., 212, 214, etc.) to skew the media to account for the discrepancy between the actual skew or rotation imparted upon the media as detected by the additional sensor(s) and the desired skew or rotation for the media (e.g., predefined media offset position 152).

The memory 410 can include output image instructions 418. The output image instructions 418 can cause the image rendering sub-system 130 to orient output images to be formed on the media based on the predefined media offset position. For example, in FIG. 1, the controller 140 caused the drive system 110 to skew the media 150 to the predefined media offset position 152 as the media 150 is driven to the image rendering sub-system 130, and the controller, correspondingly, caused the image rendering sub-system 130 to orient the output image 132 to the same predefined media offset position (e.g., 152).

In the alternative aspect, the controller 140 and its instruction sets (e.g., 412, 414, 416, 418) can be implemented on printing devices that do not include offset functionality. In such aspects, the controller 140 can serve to retrofit or modify such printing devices in order to provide the offset functionality in the examples of the printing device 100 described above.

FIG. 5 illustrates a method for offsetting a print media by an example printing device. Example methods such as described by examples of FIG. 5 can be implemented using example printing devices such as described with the examples of FIG. 1, FIG. 2A to FIG. 2B, FIG. 3 and FIG. 4. Accordingly, reference is made to the elements described with the examples of FIG. 1, FIG. 2A to FIG. 2B, FIG. 3 and FIG. 4 to illustrate suitable components for implementing the method being described.

In FIG. 5, the sensor detects an alignment of a media that is received and driven along a media path, where the media path extends from a media source to an output region (510). The alignment of the media can be inadvertently skewed slightly when being driven along the media path so that the media is not squarely aligned with the image rendering sub-system 130. If uncorrected or unaccounted for, then the output image can be askew when formed on the media. For example, in FIG. 1, the sensor 120 can detect the initial skew 122 to be equivalent to a first given angle (e.g., 1 degree) between the media path axis A-A and the media axis B-B in the leftward or counterclockwise direction. In addition, the predefined media offset position 152 can be equivalent to a second given angle (e.g., 5 degrees) angle in the leftward or counterclockwise direction. If unaccounted for, the controller 140 can cause the drive system 110 to skew the media 150 by the second given angle (e.g., 5 degrees) in the leftward or counterclockwise direction from the initial skew 122 at the first given angle (e.g., 1 degree). Accordingly, the media would be skewed at a third given angle (e.g., 6 degrees) between the A-A and B-B axes, which would cause the output image 132 (oriented to predefined media offset position 152 or 5 degrees between the A-A and B-B axes) to be askew when formed on the media.

A drive system can skew the media to a predefined media offset position as the media is driven to an image rendering sub-system (520). Based on the detected alignment by the sensor 120 and the predefined media offset position (e.g., 152), the controller 140 can cause the drive system 110 to alter the rotation of at least one of the rollers (e.g., 212, 214) of the drive system 110 (e.g., speed, direction, time, etc.). In the example of FIG. 2B, the skew roller 212 rotates in one direction and the skew roller 214 rotates in the opposite direction in order to create the moment M about the C-C axis of the media 150. In other examples, the skew rollers 212, 214 can rotate in the same direction but one of the skew rollers (e.g., 212) can rotate at a faster speed than the skew roller (e.g., 214) in order to create the same moment M. In other examples still, the skew roller 212 can rotate in the same direction as in FIG. 2B but the skew roller 214 can remain immobile (or rotate for less time than the skew roller 212) in order to create the same moment M. In variations in which the printing device 100 includes an additional sensor(s) located between the sensor 120 and the image rendering sub-system 130, the skew rollers (e.g., 212, 214, etc.) can also be utilized to correct any inaccuracy in the skew or rotation imparted upon the media as detected by the additional sensor(s).

The image rendering sub-system can orient an output image that is formed on the media based on the predefined media offset position (530). In addition, after the image rendering sub-system has formed the output image on the media, the drive system can output the media at the predefined media output position at the output region (540). If a first print job includes multiple media, then the controller 140 can cause every media and every output image for the first print job to be skewed/oriented to the first predefined media offset position and then output the media in the output region 102 at the predefined media offset position (e.g., 5 degrees leftward or counterclockwise). Similarly, for a second print job, the controller can cause every media and every output image for the second print job to be skewed/oriented to the second alternative predefined media offset position and output the media in the output region 102 at the second predefined media offset position (e.g., 5 degrees rightward or clockwise).

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A printing device comprising:
a sensor;
a drive system to drive a media along a media path from a media source to an output region;
an image rendering sub-system; and
a controller to:
  detect, using the sensor, an alignment of the media including first media of a first output job and second media of a second output job that are successive output jobs;
  cause the drive system to:
    skew the first media to a predefined media offset position in a sequence of multiple possible predefined media offset positions including a leftward media offset position that is a number of non-zero degrees leftward of a media path axis and a rightward media offset position that is a number of non-zero degrees rightward of the media path axis as the first media is driven to the image rendering sub-system, and
    skew the second media to an alternative predefined media offset position that is the next predefined media offset position in the sequence as the second media is driven to the image rendering sub-system; and
  cause the image rendering sub-system to:
    orient a first output image formed on the first media based on the predefined media offset position, and
    orient a second output image formed on the second media based on the alternative predefined media offset position; and
  output at the output region:
    the first media, with the first output image, at the predefined media offset position, and
    the second media, with the second output image, at the alternative predefined media offset position.

2. The printing device of claim 1, wherein the drive system includes a first roller and a second roller, positioned to move the media through the media path.

3. The printing device of claim 2, wherein the controller causes the drive system to skew the media by altering at least one of a rotational speed or direction of rotation of at least one of the rollers.

4. A method for offsetting media, the method comprising:
detecting, using a sensor, an alignment of a media that is received and driven along a media path, the media path extending from a media source to an output region, wherein the media includes first media of a first output job and second media of a second output job that are successive output jobs;
causing a drive system to skew:
the first media to a predefined media offset position included in a sequence of multiple possible predefined media offset positions including a leftward media offset position that is a number of non-zero degrees leftward of a media path axis and a rightward media offset position that is a number of non-zero degrees rightward of the media path axis as the media is driven to an image rendering sub-system, and
the second media to an alternative predefined media offset position that is the next predefined media offset position included in the sequence as the second media is driven to the image rendering sub-system; and
causing the image rendering sub-system to:
orient a first output image that is formed on the first media based on the predefined media offset position, and
orient a second output image formed on the second media based on the alternative predefined media offset position; and
wherein the drive system is to output:
the first media, with the output image, to have the predefined media offset position at the output region, and
the second media, with the second output image, to have the alternative predefined media offset position at the output region.

5. The method of claim 4, further comprising:
detecting, using the sensor, an initial skew of the media; and
causing the drive system to increase a degree of the initial skew of the media.

6. The method of claim 4, wherein the predefined media offset position is the leftward media offset position or the rightward media offset position.

7. The method of claim 4, wherein the drive system includes a first roller and a second roller, positioned to move the media through the media path.

8. The method of claim 7, wherein causing the drive system to skew the media includes altering at least one of a rotational speed or direction of rotation of at least one of the rollers.

9. The printing device of claim 1, wherein:
the sensor is to detect an initial skew of the media; and
the drive system is to increase a degree of the initial skew of the media.

10. The printing device of claim 1, wherein the predefined media offset position is the leftward media offset position or the rightward media offset position.

11. A controller for a printing device, the controller comprising:
a processor; and
a memory to store a set of instructions;
wherein the processor accesses the set of instructions from the memory to:
detect, using a sensor, an alignment of a media as the media is received and driven, by a drive system, along a media path, wherein the media includes first media of a first output job and second media of a second output job that are successive output jobs;
responsive to a setting, control a skew that is applied to the media by the drive system as the media is driven along the media path, the skew causing:
the first media to have a predefined media offset position included in a sequence of multiple possible predefined media offset positions including a leftward media offset position that is a number of non-zero degrees leftward of a media path axis and a rightward media offset position that is a number of non-zero degrees rightward of the media path axis as the media is received by an image rendering sub-system of the printing device, and
the second media to have an alternative predefined media offset position that is the next predefined media offset position in the sequence; and
cause the image rendering sub-system to:
orient a first output image formed on the first media of the first output job based on the predefined media offset position, and
orient a second output image formed on the second media based on the alternative predefined media offset position.

12. The controller of claim 11, wherein the controller is to:
detect, using the sensor, an initial skew of the media; and
control the skew by increasing a degree of the initial skew to skew the media to the predefined media offset position.

13. The controller of claim 11, wherein the predefined media offset position is the leftward media offset position or the rightward media offset position.

* * * * *